(12) United States Patent
Akiyama

(10) Patent No.: US 11,415,871 B2
(45) Date of Patent: Aug. 16, 2022

(54) ILLUMINATION DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/383,172

(22) Filed: Jul. 22, 2021

(65) Prior Publication Data

US 2022/0026790 A1 Jan. 27, 2022

(30) Foreign Application Priority Data

Jul. 23, 2020 (JP) .............................. JP2020-125889

(51) Int. Cl.
| | |
|---|---|
| *G03B 21/20* | (2006.01) |
| *G02B 27/14* | (2006.01) |
| *H04N 9/31* | (2006.01) |
| *G03B 33/12* | (2006.01) |

(52) U.S. Cl.
CPC ......... *G03B 21/204* (2013.01); *G02B 27/141* (2013.01); *G03B 21/2013* (2013.01); *G03B 21/2066* (2013.01); *G03B 33/12* (2013.01); *H04N 9/3161* (2013.01); *H04N 9/3164* (2013.01)

(58) Field of Classification Search
CPC .............. G03B 21/204; G03B 21/2066; G03B 21/2013; G02B 27/141; H04N 9/3161; H04N 9/3164

USPC ........................................................... 353/31
See application file for complete search history.

(56) References Cited

U.S. PATENT DOCUMENTS

| | | | |
|---|---|---|---|
| 2017/0153538 | A1 | 6/2017 | Kawasumi |
| 2017/0199451 | A1* | 7/2017 | Akiyama ........... G02B 27/0961 |
| 2018/0067389 | A1 | 3/2018 | Kikuma et al. |
| 2018/0074391 | A1* | 3/2018 | Kikuma .................. H04N 9/00 |

FOREIGN PATENT DOCUMENTS

| | | |
|---|---|---|
| JP | 2017-097310 A | 6/2017 |
| JP | 2017-194523 A | 10/2017 |
| JP | 2018-040935 A | 3/2018 |
| JP | 2018-045027 A | 3/2018 |

* cited by examiner

*Primary Examiner* — Jerry L Brooks
(74) *Attorney, Agent, or Firm* — Oliff PLC

(57) ABSTRACT

An illumination device includes a light emitting element emitting first light, wavelength conversion element converting the first light into second, first optical element, second optical element having a first area transmitting the second light, and second area transmitting part of the first light and reflecting another part, and third optical element having a third area transmitting the second light, and fourth area transmitting part of the first light and reflecting another part. The first area first light transmittance in the second optical element is higher than that in the second area, the second optical element position made switchable between first and second positions, the third area first light transmittance in the third optical element is higher than that in the fourth area, the third optical element position is made switchable between third and fourth positions, and the fourth area first light transmittance is different from that in the second area.

6 Claims, 7 Drawing Sheets

ILLUMINATION DEVICE AND PROJECTOR

The present application is based on, and claims priority from JP Application Serial Number 2020-125889, filed Jul. 23, 2020, the disclosure of which is hereby incorporated by reference herein in its entirety.

BACKGROUND

1. Technical Field

The present disclosure relates to an illumination device and a projector.

2. Related Art

As an illumination device used for a projector, there is proposed an illumination device using fluorescence emitted from a phosphor when irradiating the phosphor with excitation light emitted from a light emitting element.

In JP-A-2017-194523 (Document 1), there is disclosed a light source device provided with a light source for emitting the excitation light, a wavelength conversion element for conversing the excitation light into the fluorescence, a dichroic mirror which reflects the excitation light and transmits the fluorescence, and a collecting lens unit for guiding the excitation light emitted from the dichroic mirror to the wavelength conversion element.

In JP-A-2018-40935 (Document 2), there is disclosed a projector provided with a light source for emitting blue light, a phosphor for generating yellow light from a part of the blue light and reflects the blue light and the yellow light, and a filter for reflecting a part of the blue light reflected by the phosphor, toward the phosphor. In Document 2, it is described that the filter is made replaceable between a position at which the filter is disposed on a light path, and a position at which the filter is retracted from the light path, and it is possible to change the proportion of the blue light and the yellow light to the illumination light based on which one of the positions the filter is placed at, and therefore, it is possible to adjust a color temperature of the illumination light.

In JP-A-2018-45027 (Document 3), there is disclosed a projector provided with a light source, a phosphor, and a filter substantially the same as those in Document 2. In Document 3, there is disclosed a configuration of inserting a part of the filter into the light path, and it is described that it is possible to adjust the color temperature of the illumination light by adjusting an amount of the insertion of the filter into the light path.

In the illumination devices described in Document 1 through Document 3, by reflecting a part of the excitation light having a blue color with the phosphor, and emitting the yellow light generated by the wavelength conversion from the phosphor, it is possible to obtain the illumination light having a white color. However, in the illumination device of Document 1, it is difficult to adjust the white balance of the illumination light when the white balance is lost due to, for example, a temporal change in the phosphor. In contrast, in the illumination devices of Document 2 and Document 3, it is possible to adjust the white balance by reflecting the blue light component included in the illumination light with the filter. However, since a part of the blue light reflected by the filter toward the phosphor is reflected by the dichroic mirror disposed on the light path and fails to return to the phosphor, there is a problem that a loss of the blue light occurs.

SUMMARY

In view of the problems described above, an illumination device according to an aspect of the present disclosure includes a light emitting element configured to emit first light in a first wavelength band, a wavelength conversion element configured to convert the first light into second light in a second wavelength band different from the first wavelength band, a first optical element configured to reflect one of the first light and the second light, transmit another of the first light and the second light, and make the first light enter the wavelength conversion element, a second optical element having a first area configured to transmit the second light, and a second area configured to transmit a part of the first light and reflect another part of the first light, and a third optical element having a third area configured to transmit the second light, and a fourth area configured to transmit a part of the first light and reflect another part of the first light, wherein in the second optical element, a transmittance of the first light in the first area is higher than a transmittance of the first light in the second area, a position of the second optical element is made switchable between a first position where the second light which is transmitted or reflected by the first optical element enters the first area, and the first light emitted from the wavelength conversion element enters the second area, and a second position where the second light which is transmitted or reflected by the first optical element fails to enter the first area, and the first light emitted from the wavelength conversion element fails to enter the second area, in the third optical element, a transmittance of the first light in the third area is higher than a transmittance of the first light in the fourth area, a position of the third optical element is made switchable between a third position where the second light which is transmitted or reflected by the first optical element enters the third area, and the first light emitted from the wavelength conversion element enters the fourth area, and a fourth position where the second light which is transmitted or reflected by the first optical element fails to enter the third area, and the first light emitted from the wavelength conversion element fails to enter the fourth area, and the transmittance of the first light in the fourth area of the third optical element is different from the transmittance of the first light in the second area of the second optical element.

Further, an illumination device according to another aspect of the present disclosure includes a light emitting element configured to emit first light in a first wavelength band, a wavelength conversion element configured to convert the first light into second light in a second wavelength band different from the first wavelength band, a first optical element configured to reflect one of the first light and the second light, transmit another of the first light and the second light, and make the first light enter the wavelength conversion element, a fourth optical element having a fifth area configured to transmit the second light, and a sixth area configured to transmit a part of the first light and reflect another part of the first light, and a fifth optical element having a seventh area configured to transmit the second light, and an eighth area configured to transmit a part of the first light and reflect another part of the first light, wherein in the fourth optical element, a transmittance of the first light in the fifth area is higher than a transmittance of the first light in the sixth area, a position of the fourth optical element is made switchable between a fifth position where the second light which is transmitted or reflected by the first optical element enters the fifth area, and the first light emitted from the wavelength conversion element enters the sixth area, and a sixth position where the second light which is transmitted or reflected by the first optical element fails to enter the fifth area, and the first light emitted from the wavelength conversion element fails to enter the sixth area, in the fifth optical element, a transmittance of the first light in the seventh area is higher than a transmittance of the first light in the eighth area, a position of the fifth optical element is made switchable between a seventh position where the second light which is transmitted or reflected by the first optical element enters the seventh area, and the first light emitted from the wavelength conversion element enters the eighth area, and an eighth position where the second light which is transmitted or reflected by the first optical element fails to enter the seventh area, and the first light emitted from the wavelength conversion element fails to enter the eighth area, and an area of the eighth area of the fifth optical element is different from an area of the sixth area of the fourth optical element.

Further, a projector according to still another aspect of the present disclosure includes the illumination device according to the aspect of the present disclosure, a light modulation device configured to modulate light from the illumination device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 7.

It should be noted that in each of the drawings described below, the constituents are shown with the scale ratios of respective sizes set differently between the constituents in some cases in order to facilitate the visualization of each of the constituents.

An example of a projector according to the present embodiment will be described.

Figure 1:
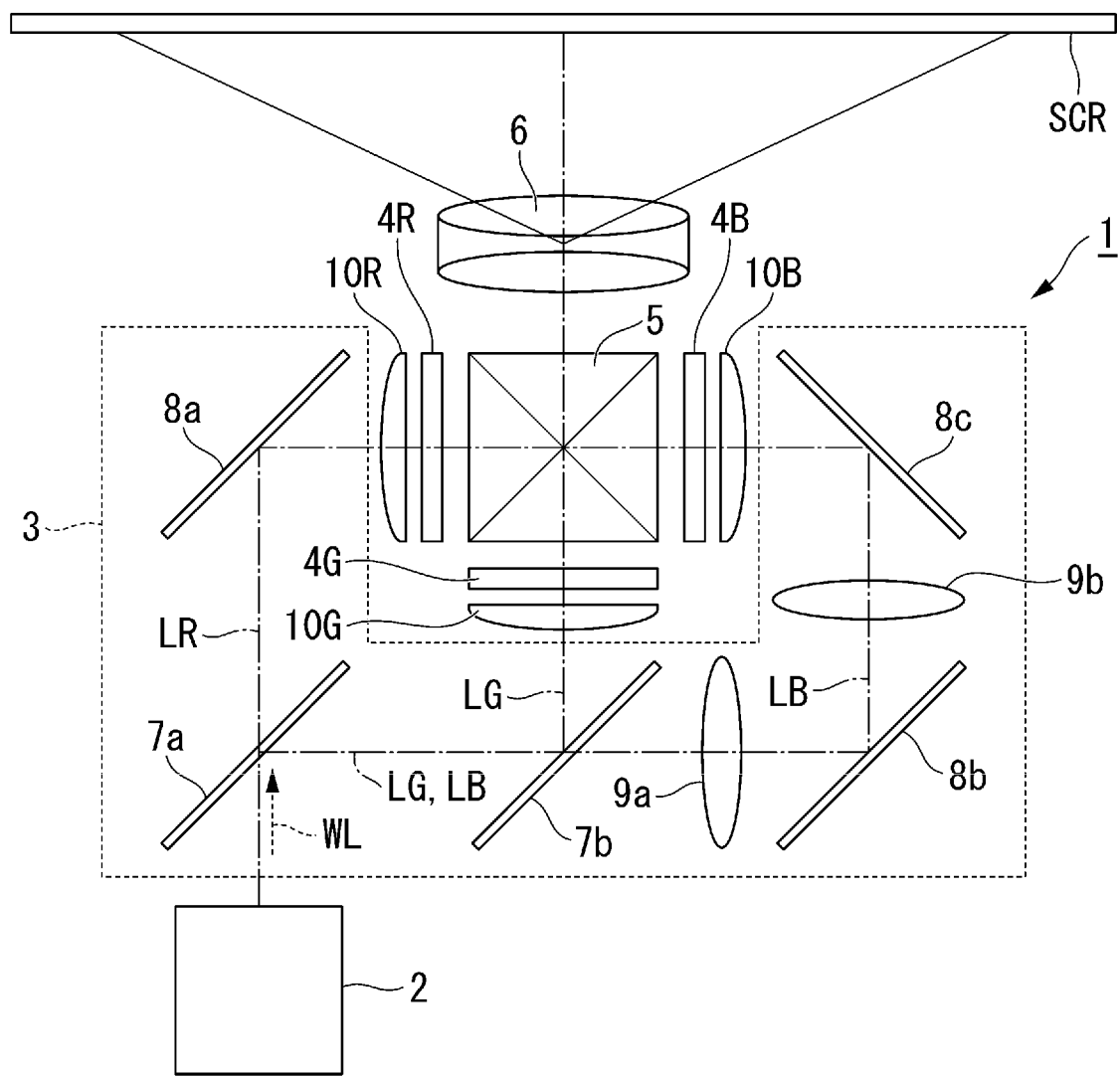
FIG. 1 is a schematic configuration diagram of a projector according to a first embodiment.

FIG. 1 is a schematic configuration diagram of the projector according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. A configuration of the illumination device 2 will be described later.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates illumination light WL emitted from the illumination device 2 into red light LR, green light LG, and blue light LB, and then guides the red light LR to the light modulation device 4R, guides the green light LG to the light modulation device 4G, and guides the blue light LB to the light modulation device 4B.

A field lens 10R is disposed between the color separation optical system 3 and the light modulation device 4R, and substantially collimates the incident light and then emits the result toward the light modulation device 4R. A field lens 10G is disposed between the color separation optical system 3 and the light modulation device 4G, and substantially collimates the incident light and then emits the result toward the light modulation device 4G. A field lens 10B is disposed between the color separation optical system 3 and the light modulation device 4B, and substantially collimates the incident light and then emits the result toward the light modulation device 4B.

The first dichroic mirror 7a transmits a red light component, and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR having been transmitted through the first dichroic mirror 7a is reflected by the reflecting mirror 8a, and is then transmitted through the field lens 10R to enter an image formation area of the light modulation device 4R for the red light. The green light LG having been reflected by the first dichroic mirror 7a is further reflected by the second dichroic mirror 7b, and then transmitted through the field lens 10G to enter an image formation area of the light modulation device 4G for the green light. The blue light LB having been transmitted through the second dichroic mirror 7b enters an image formation area of the light modulation device 4B for the blue light via the relay lens 9a, the reflecting mirror 8b at the incident side, the relay lens 9b, the reflecting mirror 8c at the exit side, and the field lens 10B.

The light modulation device 4R, the light modulation device 4G, and the light modulation device 4B each modulate the colored light having entered the light modulation device in accordance with image information to thereby form image light. The light modulation device 4R, the light modulation device 4G, and the light modulation device 4B are each formed of a liquid crystal light valve. Although not shown in the drawings, at the light incident side of each of the light modulation device 4R, the light modulation device 4G, and the light modulation device 4B, there is disposed an incident side polarization plate. At the light exit side of each of the light modulation device 4R, the light modulation device 4G, and the light modulation device 4B, there is disposed an exit side polarization plate.

The combining optical system 5 combines the image light emitted from the light modulation device 4R, the image light emitted from the light modulation device 4G, and the image light emitted from the light modulation device 4B with each other to form full-color image light. The combining optical system 5 is formed of a cross dichroic prism having four rectangular prisms bonded to each other to have a substantially square shape in the plan view. On the interfaces having a substantially X shape on which the rectangular prisms are bonded to each other, there are formed dielectric multilayer films.

The image light emitted from the combining optical system 5 is projected by the projection optical device 6 in an enlarged manner to form an image on the screen SCR. In other words, the projection optical device 6 projects the light modulated by the light modulation device 4R, the light modulated by the light modulation device 4G, and the light modulated by the light modulation device 4B. The projection optical device 6 is constituted by a plurality of projection lenses.

An example of the illumination device 2 according to the present embodiment will be described.

Hereinafter, in FIG. 2, using an XYZ orthogonal coordinate system, an axis parallel to a principal ray of blue light BL emitted from the light source device 20 is defined as an X axis, an axis parallel to a principal ray of fluorescence YL emitted from the wavelength conversion element 23 is defined as a Y axis, and an axis perpendicular to the X axis and the Y axis is defined as a Z axis.

Further, an axis extending along the principal ray of the blue light BL is referred to as an optical axis ax4 of the light source device 20. Therefore, the optical axis ax4 of the light source device 20 is parallel to the X axis. An axis extending along the principal ray of the fluorescence YL is referred to as an optical axis ax5 of the wavelength conversion element 23. Therefore, the optical axis ax5 of the wavelength conversion element 23 is parallel to the Y axis.

Figure 2:
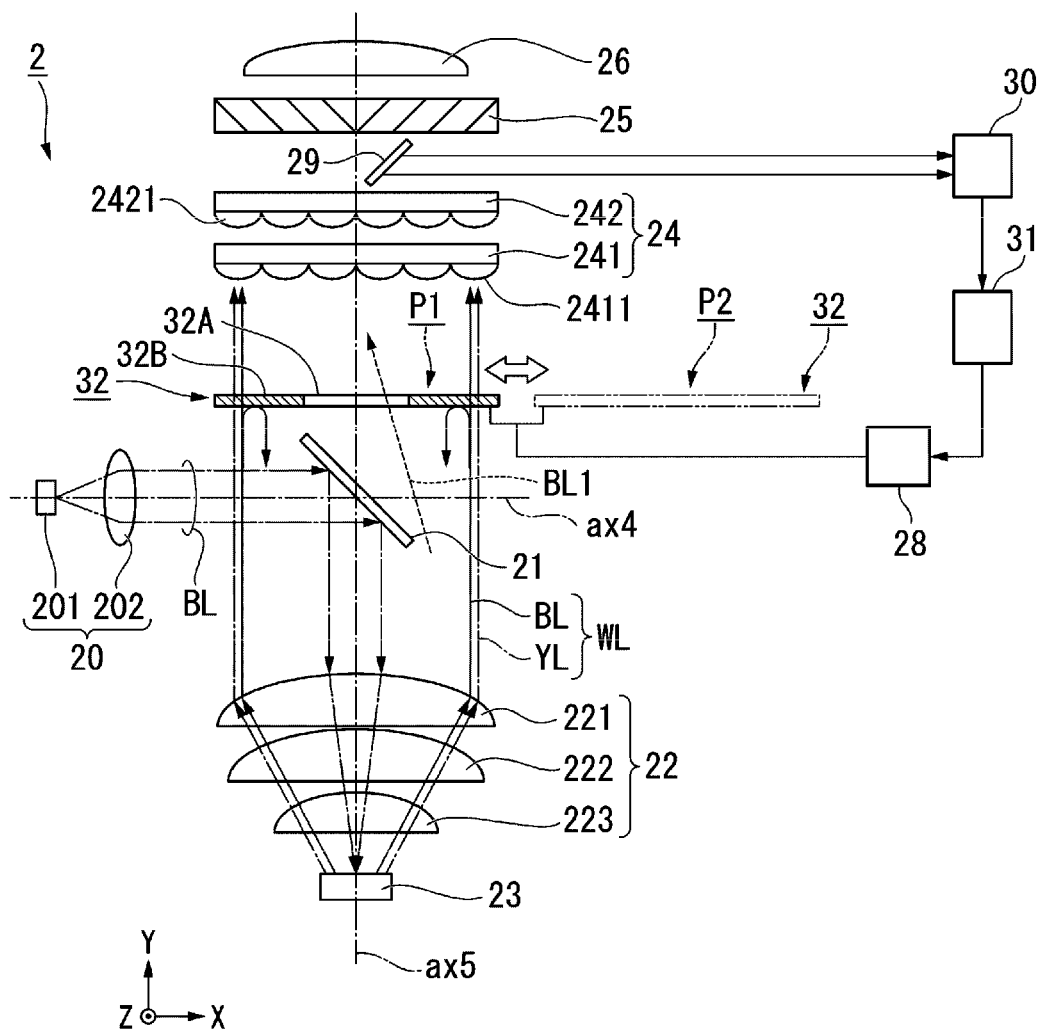
FIG. 2 is a schematic configuration diagram of an illumination device according to the first embodiment.

FIG. 2 is a plan view showing a schematic configuration of the illumination device 2 viewed from the Z-axis direction.

As shown in FIG. 2, the illumination device 2 according to the present embodiment is provided with a light source device 20, a first optical element 21, a light collecting optical system 22, a wavelength conversion element 23, a second optical element 32, a switching device 28, an integrator optical system 24, a polarization conversion element 25, a superimposing lens 26, a light intensity monitoring mirror 29, a sensor unit 30, and a control device 31. Further, the illumination device 2 according to the present embodiment is further provided with a third optical element 33 shown in FIG. 5A, a sixth optical element 34 shown in FIG. 5B, and a seventh optical element 35 shown in FIG. 5C as optical elements with which the second optical element 32 is replaced for adjusting the white balance.

The light source device 20 has a light emitting element 201 and a collimating element 202.

The light emitting element 201 is formed of a blue semiconductor laser, and emits the blue light BL in a first wavelength band. The blue semiconductor laser emits the blue light BL in the first wavelength band having a peak wavelength in a wavelength band of, for example, 380 nm through 495 nm.

The blue light BL in the present embodiment corresponds to first light in the appended claims.

The collimating element 202 is disposed so as to correspond to the light emitting element 201. The collimating element 202 is constituted by a collimator lens formed of a convex lens. The collimating element 202 collimates the blue light BL emitted from the light emitting element 201.

The first optical element 21 is formed of a dichroic mirror disposed so as to form an angle of 45° with each of the optical axis ax4 and the optical axis ax5. In other words, the first optical element 21 is disposed at a position where the first optical element 21 crosses the optical axis ax4 of the light source device 20 and the optical axis ax5 of the wavelength conversion element 23. The first optical element 21 has a property of reflecting light in the blue wavelength band while transmitting light in the yellow wavelength band. Therefore, the first optical element 21 reflects the blue light BL emitted from the light source device 20, transmits the fluorescence YL emitted from the wavelength conversion element 23, and at the same time, makes the blue light BL enter the wavelength conversion element 23.

The light collecting optical system 22 is disposed between the first optical element 21 and the wavelength conversion element 23. The light collecting optical system 22 is constituted by three convex lenses formed of a first lens 221, a second lens 222, and a third lens 223. The light collecting optical system 22 has positive power. It should be noted that the number of the lenses constituting the light collecting optical system 22 is not particularly limited. The light collecting optical system 22 collects the blue light BL reflected by the first optical element 21, and makes the result enter the wavelength conversion element 23. Further, the light collecting optical system 22 collimates the blue light BL and the fluorescence YL emitted from the wavelength conversion element 23.

The wavelength conversion element 23 converts the blue light BL emitted from the light collecting optical system into the fluorescence YL in a second wavelength band different from the first wavelength band. The wavelength conversion layer 233 includes a ceramic phosphor for converting the blue light BL into the fluorescence YL having a yellow color. The second wavelength band is, for example, 490 through 750 nm, and the fluorescence YL is yellow light including the green light component and the red light component. It should be noted that it is also possible for the phosphor to include a single-crystal phosphor.

The fluorescence YL in the present embodiment corresponds to second light in the appended claims.

The wavelength conversion element 23 includes, for example, an yttrium aluminum garnet (YAG) type phosphor. When citing YAG:Ce including cerium (Ce) as an activator agent as an example, a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, YAG particles obtained by a gas-phase process such as a spray drying process, a flame heat decomposition process, or a thermal plasma process, and so on can be used as the phosphor.

Further, the wavelength conversion element 23 includes a scattering element for scattering the blue light BL and the fluorescence YL. As the scattering element, there is used, for example, a plurality of air holes. By including the scattering element of this kind, a part of the blue light BL having entered the wavelength conversion element 23 is converted in wavelength into the fluorescence YL, and another part of the blue light BL is backscattered by the scattering element, and is then emitted to the outside of the wavelength conversion element 23 without making a contribution to the wavelength conversion. On this occasion, the blue light BL is emitted from the wavelength conversion element in a state of being diffused into an angular distribution substantially the same as the angular distribution of the fluorescence YL. Further, the fluorescence YL generated by the wavelength conversion element 23 is also scattered by the scattering element, and is then emitted to the outside of the wavelength conversion element 23.

In the case of the present embodiment, the first optical element 21 is not disposed with an excessively large size, but is disposed with a minimum size required to reflect the blue light BL emitted from the light source device 20. As described above, the fluorescence YL emitted from the wavelength conversion element 23 is substantially collimated by being transmitted through the light collecting optical system 22. Since the first optical element 21 has a property of transmitting the yellow light component, a central portion of the fluorescence YL entering the first optical element 21 out of the fluorescence YL thus substantially collimated is transmitted through the first optical element 21. Further, a rim portion of the fluorescence YL passes through a space outside the first optical element 21 without entering the first optical element 21.

Further, the blue light BL emitted from the wavelength conversion element 23 is substantially collimated by being transmitted through the light collecting optical system 22 similarly to the fluorescence YL. A central portion of the blue light BL out of the blue light BL thus substantially collimated enters the first optical element 21. In contrast, a rim portion of the blue light BL passes through a space outside the first optical element 21 without entering the first optical element 21. The central portion of the blue light BL entering the first optical element 21 is reflected by the first optical element 21 to cause a loss, but the rim portion of the blue light BL which does not enter the first optical element 21 is used as the illumination light WL together with the fluorescence YL. On this occasion, since the first optical element 21 is disposed with the minimum required size, it is possible to reduce the blue light BL which is reflected by the first optical element 21 to cause the loss.

The second optical element 32 is disposed between the first optical element 21 and the integrator optical system 24. Further, it is desirable that the second optical element 32 is disposed at a position as close as possible to the first optical element 21 without making another optical element intervene between the second optical element 32 and the first optical element 21. Alternatively, it is possible for the second optical element 32 to have contact with the first optical element 21. In other words, the second optical element 32 is disposed immediately behind the first optical element 21 when viewed from a proceeding direction of the blue light BL and the fluorescence YL.

Figure 3:
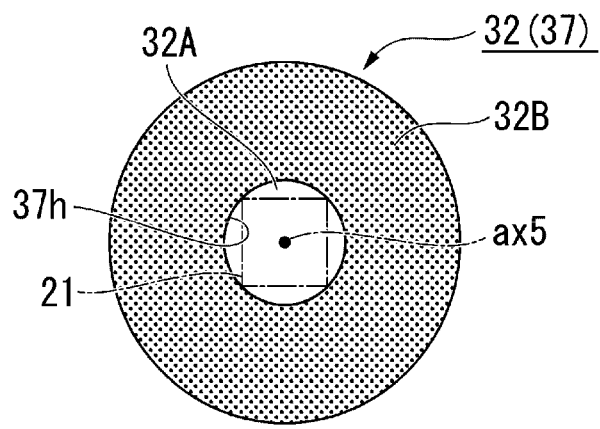
FIG. 3 is a front view of a second optical element.

FIG. 3 is a front view of the second optical element 32 viewed from the Y-axis direction.

As shown in FIG. 2 and FIG. 3, the second optical element 32 has a first area 32A for transmitting the fluorescence YL, and a second area 32B which transmits a part of the blue light BL and reflects another part of the blue light BL, and transmits the fluorescence YL. The first area 32A and the second area 32B are concentrically formed centering on the optical axis ax5. The first area 32A is disposed in the central portion, and the second area 32B is disposed in the rim portion surrounding the first area 32A. Further, when viewed from the direction of the optical axis ax5, the first area 32A is disposed at a position where the first area 32A overlaps the first optical element 21, and the second area 32B is disposed at a position where the second area 32B does not overlap the first optical element 21.

Specifically, the second optical element 32 is formed of a first dichroic mirror 37 which transmits a part of the blue light BL and reflects another part of the blue light BL, and transmits the fluorescence YL. A central portion of the first dichroic mirror 37 is provided with an opening part 37h. The first area 32A is formed of the opening part 37h provided to the first dichroic mirror 37, and the second area 32B is formed of a portion other than the opening part 37h. Therefore, in the case of the present embodiment, the first area 32A not only transmits the fluorescence YL with a transmittance of 100%, but also transmits the blue light BL with a transmittance of 100%.

Figure 4:
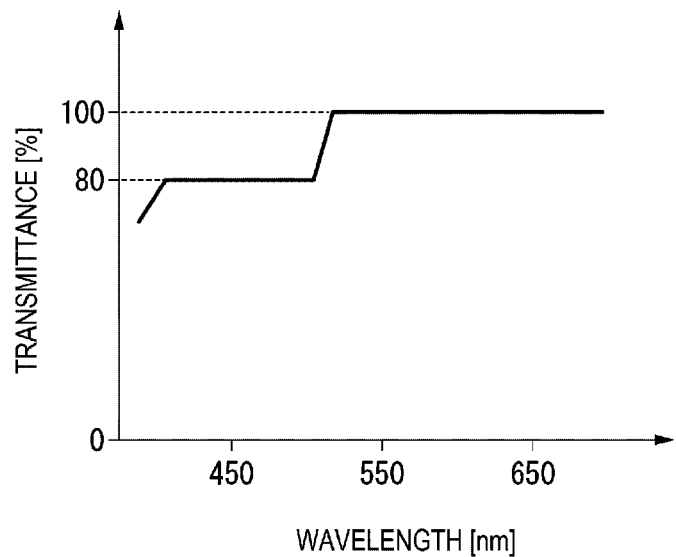
FIG. 4 is a diagram showing a transmission/reflection characteristic of a second area in the second optical element.

FIG. 4 is a diagram showing a transmission/reflection characteristic of the second area 32B in the second optical element 32. In FIG. 4, the horizontal axis represents the wavelength (nm), and the vertical axis represents the transmittance (%).

As shown in FIG. 4, in the second area 32B, the transmittance in the blue wavelength band centering on the wavelength of about 450 nm is 80%, and the transmittance in the yellow wavelength band longer in wavelength than the blue wavelength band is 100%. The transmittance in the blue wavelength band is not required to be 80%, and can arbitrarily be adjusted.

Figure 5A:
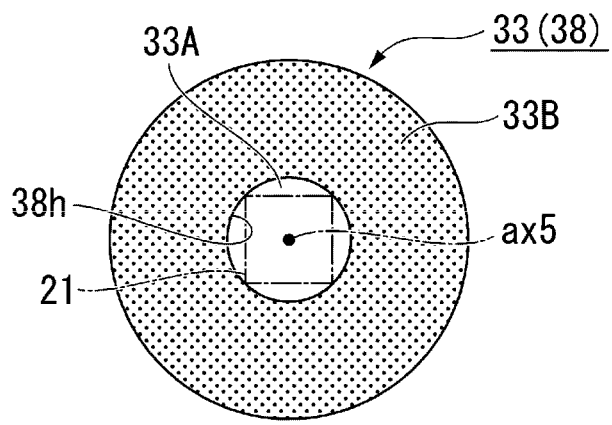
FIG. 5A is a front view of a third optical element.
Figure 5B:
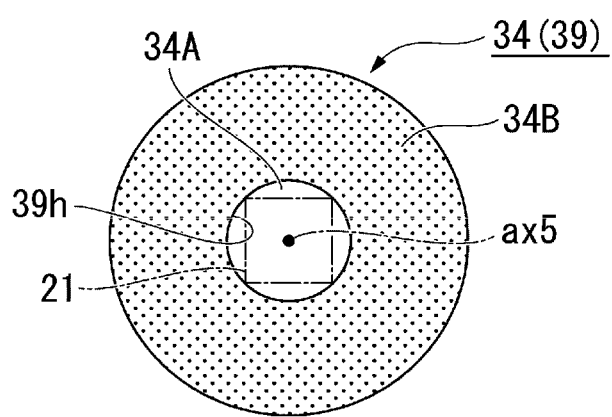
FIG. 5B is a front view of a sixth optical element.
Figure 5C:
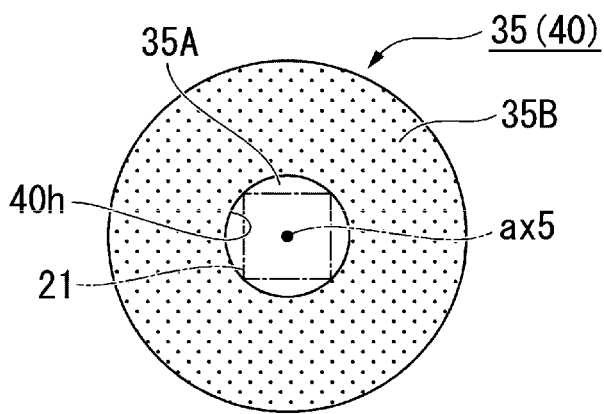
FIG. 5C is a front view of a seventh optical element.

FIG. 5A is a front view of the third optical element 33 viewed from the optical axis ax5 direction. FIG. 5B is a front view of the sixth optical element 34 viewed from the optical axis ax5 direction. FIG. 5C is a front view of the seventh optical element 35 viewed from the optical axis ax5 direction.

As shown in FIG. 5A through FIG. 5C, the illumination device 2 according to the present embodiment is further provided with the third optical element 33, the sixth optical element 34, and the seventh optical element 35.

As shown in FIG. 5A, the third optical element 33 has a third area 33A which is disposed in a central portion, and transmits the blue light BL and the fluorescence YL, and a fourth area 33B which is disposed in a rim portion, transmits a part of the blue light BL and reflects another part of the blue light BL, and transmits the fluorescence YL. The transmittance of the blue light BL in the fourth area 33B of the third optical element 33 is different from the transmittance of the blue light BL in the second area 32B of the second optical element 32.

Specifically, the third optical element 33 is formed of a second dichroic mirror 38 which transmits a part of the blue light BL and reflects another part of the blue light BL, and transmits the fluorescence YL. A central portion of the second dichroic mirror 38 is provided with an opening part 38h. The third area 33A is formed of the opening part 38h provided to the second dichroic mirror 38, and the fourth area 33B is formed of a portion other than the opening part 38h. Therefore, in the case of the present embodiment, the third area 33A not only transmits the fluorescence YL with a transmittance of 100%, but also transmits the blue light BL with a transmittance of 100%.

As shown in FIG. 5B, the sixth optical element 34 has a ninth area 34A which is disposed in a central portion, and transmits the blue light BL and the fluorescence YL, and a tenth area 34B which is disposed in a rim portion, transmits a part of the blue light BL and reflects another part of the blue light BL, and transmits the fluorescence YL. The transmittance of the blue light BL in the tenth area 34B of the sixth optical element 34 is different from the transmittance of the blue light BL in the second area 32B of the second optical element 32.

Specifically, the sixth optical element 34 is formed of a fifth dichroic mirror 39 which transmits a part of the blue light BL and reflects another part of the blue light BL, and transmits the fluorescence YL. A central portion of the fifth dichroic mirror 39 is provided with an opening part 39h. The ninth area 34A is formed of the opening part 39h provided to the fifth dichroic mirror 39, and the tenth area 34B is formed of a portion other than the opening part 39h. Therefore, in the case of the present embodiment, the ninth area 34A not only transmits the fluorescence YL with a transmittance of 100%, but also transmits the blue light BL with a transmittance of 100%.

As shown in FIG. 5C, the seventh optical element 35 has an eleventh area 35A which is disposed in a central portion, and transmits the blue light BL and the fluorescence YL, and a twelfth area 35B which is disposed in a rim portion, transmits a part of the blue light BL and reflects another part of the blue light BL, and transmits the fluorescence YL. The transmittance of the blue light BL in the twelfth area 35B of the seventh optical element 35 is different from the transmittance of the blue light BL in the second area 32B of the second optical element 32.

Specifically, the seventh optical element 35 is formed of a sixth dichroic mirror 40 which transmits a part of the blue light BL and reflects another part of the blue light BL, and transmits the fluorescence YL. A central portion of the sixth dichroic mirror 40 is provided with an opening part 40h. The eleventh area 35A is formed of the opening part 40h provided to the sixth dichroic mirror 40, and the twelfth area 35B is formed of a portion other than the opening part 40h. Therefore, in the case of the present embodiment, the eleventh area 35A not only transmits the fluorescence YL with a transmittance of 100%, but also transmits the blue light BL with a transmittance of 100%.

As described above, a configuration of each of the third optical element 33, the sixth optical element 34, and the seventh optical element 35 is substantially the same as the configuration of the second optical element 32. It should be noted that the transmittance of the blue light BL in the fourth area 33B of the third optical element 33, the transmittance of the blue light BL in the tenth area 34B of the sixth optical element 34, and the transmittance of the blue light BL in the twelfth area 35B of the seventh optical element 35 are each different from the transmittance of the blue light BL in the second area 32B of the second optical element 32. Specifically, the transmittance of the blue light BL in the fourth area 33B of the third optical element 33 is, for example, 60%. The transmittance of the blue light BL in the tenth area 34B of the sixth optical element 34 is, for example, 40%. The transmittance of the blue light BL in the twelfth area 35B of the seventh optical element 35 is, for example, 20%.

The third optical element 33, the sixth optical element 34, and the seventh optical element 35 are used when adjusting the white balance. It is possible to use one of these optical elements 33, 34, and 35 in the form of replacing the second optical element 32. Alternatively, it is possible to use two or more of the second optical element 32, the third optical element 33, the sixth optical element 34, and the seventh optical element 35 together with each other in the form of being sequentially disposed on the optical axis ax5. Further, the values of the transmittances described above in the respective optical elements 33, 34, and 35 can arbitrarily be changed.

Further, the area which is disposed in the central portion of each of the optical elements 32, 33, 34, and 35, and transmits the blue light BL and the fluorescence YL is not necessarily required to be formed of the opening part, and can be formed of a light transmissive material such as glass. In either of the case in which the area is formed of the opening part, or the case in which the area is formed of the light transmissive material, the transmittance of the blue light BL in that area is higher than the transmittance of the blue light BL in an area in the rim portion. The functions and the advantages of each of the optical elements 32, 33, 34, and 35 will be described later.

As shown in FIG. 2, the switching device 28 switches the position of the second optical element 32. Specifically, the second optical element 32 is arranged to be able to be switched by the switching device 28 between a first position P1 where the second optical element 32 enters the light paths of the blue light BL and the fluorescence YL emitted from the wavelength conversion element 23, and a second position P2 where the second optical element 32 is retracted from the light paths of the blue light BL and the fluorescence YL emitted from the wavelength conversion element 23.

In other words, the second optical element 32 is arranged to be able to be switched by the switching device 28 between the first position P1 where the fluorescence YL transmitted through the first optical element 21 enters the first area 32A, and the blue light BL emitted from the wavelength conversion element 23 enters the second area 32B, and the second position P2 where the fluorescence YL transmitted through the first optical element 21 fails to enter the first area 32A, and the blue light BL emitted from the wavelength conversion element 23 fails to enter the second area 32B. A specific configuration of the switching device 28 is not particularly limited, and it is possible to use a known driving device capable of moving the position of the second optical element 32 such as a drive mechanism having a motor and a ball screw.

It should be noted that assuming that the second optical element 32 is replaced with the third optical element, the switching device 28 switches the position of the third optical element 33. The third optical element 33 is arranged to be able to be switched by the switching device 28 between a third position where the third optical element 33 enters the light paths of the blue light BL and the fluorescence YL emitted from the wavelength conversion element 23, and a fourth position where the third optical element 33 is retracted from the light paths of the blue light BL and the fluorescence YL emitted from the wavelength conversion element 23.

In other words, the third optical element 33 is arranged to be able to be switched by the switching device 28 between the third position where the fluorescence YL transmitted through the first optical element 21 enters the third area 33A, and the blue light BL emitted from the wavelength conversion element 23 enters the fourth area 33B, and the fourth position where the fluorescence YL transmitted through the first optical element 21 fails to enter the third area 33A, and the blue light BL emitted from the wavelength conversion element 23 fails to enter the fourth area 33B. Further, the same as the third optical element 33 described above is also applied to the sixth optical element 34 and the seventh optical element 35.

In such a manner as described above, the blue light BL and the fluorescence YL are transmitted through the second optical element 32, and then enter the integrator optical system 24. By the blue light BL and the fluorescence YL having the yellow color being combined with each other, the illumination light WL having the white color is generated.

The integrator optical system 24 has a first multi-lens array 241, and a second multi-lens array 242. The first multi-lens array 241 has a plurality of first lenses 2411 for dividing the illumination light WL into a plurality of partial lights.

A lens surface of the first multi-lens array 241, namely a surface of the first lens 2411, and the image formation area of each of the light modulation devices 4R, 4G, and 4B are conjugated with each other. Therefore, the shape of each of the first lenses 2411 is a rectangular shape as a substantially similar shape to the shape of each of the image formation areas of the light modulation devices 4R, 4G, and 4B when viewed from the direction of the optical axis ax5. Thus, each of the partial lights emitted from the first multi-lens array 241 efficiently enters each of the image formation areas of the light modulation devices 4R, 4G, and 4B.

The second multi-lens array 242 has a plurality of second lenses 2421 corresponding respectively to the plurality of first lenses 2411 of the first multi-lens array 241. The second multi-lens array 242 forms images of the respective first lenses 2411 of the first multi-lens array 241 in the vicinity of each of the image formation areas of the respective light modulation devices 4R, 4G, and 4B in cooperation with the superimposing lens 26.

The illumination light WL having been transmitted through the integrator optical system 24 enters the polarization conversion element 25. The polarization conversion element 25 has a configuration in which polarization split films and wave plates not shown are arranged in an array. The polarization conversion element 25 uniforms the polarization direction of the illumination light WL into a predetermined direction. Specifically, the polarization conversion element 25 uniforms the polarization direction of the illumination light WL into a direction of a transmission axis of the incident side polarization plate of each of the light modulation devices 4R, 4G, and 4B.

Thus, the polarization direction of the red light LR, the green light LG, and the blue light LB separated from the illumination light WL having been transmitted through the polarization conversion element 25 coincides with the transmission axis direction of the incident side polarization plate of each of the light modulation devices 4R, 4G, and 4B. Therefore, the red light LR, the green light LG, and the blue light LB enter the image formation areas of the light modulation devices 4R, 4G, and 4B, respectively, without being blocked by the incident side polarization plates, respectively.

The illumination light WL having been transmitted through the polarization conversion element 25 enters the superimposing lens 26. The superimposing lens 26 homogenizes the illuminance distribution in the image formation area of each of the light modulation devices 4R, 4G, and 4B as an illumination target area in cooperation with the integrator optical system 24.

Further, on the light path between the integrator optical system 24 and the polarization conversion element 25, there is disposed the light intensity monitoring mirror 29. The light intensity monitoring mirror 29 is disposed so as to form an angle of 45° with the optical axis ax5. The light intensity monitoring mirror 29 transmits a part of the incident light, and reflects the rest of the incident light. The light having been transmitted through the light intensity monitoring mirror 29 enters the polarization conversion element 25, and the light having been reflected by the light intensity monitoring mirror 29 enters the sensor unit 30. The detailed configuration of the sensor unit 30 will be described later.

The light intensity monitoring mirror 29 is held by a holding member not shown disposed away from the light incident area of the polarization conversion element 25. The light incident area of the polarization conversion element 25 is an area, which each of divisional beams having been emitted from the integrator optical system 24 enters. The light intensity monitoring mirror 29 is disposed at a position where a secondary light source image of the blue light BL having been emitted from the light emitting element 201 is formed. Here, there is shown an example in which the light intensity monitoring mirror 29 is disposed on the light path between the integrator optical system 24 and the polarization conversion element 25. Instead of this example, it is also possible to adopt a configuration in which the light intensity monitoring mirror 29 is disposed on the light path between the polarization conversion element 25 and the superimposing lens 26.

In the case of the present embodiment, the light intensity monitoring mirror 29 is disposed at the formation position of the secondary light source image on the light path between the integrator optical system 24 and the polarization conversion element 25. Therefore, even when the light intensity monitoring mirror 29 is disposed in the light path to take out a part of the light, there is no chance that the illuminance variation occurs on the light modulation device 4R for the red light, the light modulation device 4G for the green light, and the light modulation device 4B for the blue light as the illumination target area. Therefore, when the illuminance deterioration as much as one secondary light source image can be allowed, it is not necessarily required for the light intensity monitoring mirror 29 to be a mirror for transmitting a part of the light and reflecting the rest of the light, and it is also possible for the light intensity monitoring mirror 29 to be a mirror for reflecting the whole of the light.

Although not shown in the drawings, the sensor unit 30 is provided with a blue light sensor for detecting the intensity of the blue light BL, a yellow light sensor for detecting the intensity of the fluorescence YL having the yellow color, and a dichroic mirror for separating the blue light BL and the fluorescence YL having the yellow color from each other. The light having been taken out from the light intensity monitoring mirror 29 enters the sensor unit 30, and the blue light BL and the fluorescence YL having the yellow color are separated from each other by the dichroic mirror. The intensity of the blue light BL is detected by the blue light sensor. The intensity of the fluorescence YL having the yellow color is detected by the yellow light sensor.

The detection result of the intensity of the blue light BL and the intensity of the fluorescence YL having the yellow color from the sensor unit 30 is output to the control device 31. The control device 31 switches the position of the second optical element 32, and replace the second optical element 32 with one of the third optical element 33, the sixth optical element 34, and the seventh optical element 35 so that the ratio between the intensity of the blue light BL and the intensity of the fluorescence YL having the yellow color approaches a reference value. The reference value of the ratio between the intensity of the blue light LB and the intensity of the fluorescence YL having the yellow color can be a value decided based on an initial intensity of the blue light BL and an initial intensity of the fluorescence YL having the yellow color at a time point when starting use of the illumination device 2 measured by the sensor unit 30. Alternatively, it is also possible to use a design value of the illumination device 2 as the reference value of the ratio between the intensity of the blue light BL and the intensity of the fluorescence YL having the yellow color.

Here, it is assumed that the light intensity of the fluorescence YL emitted from the wavelength conversion element 23 drops due to the temporal change during use of the projector 1.

Figure 6:
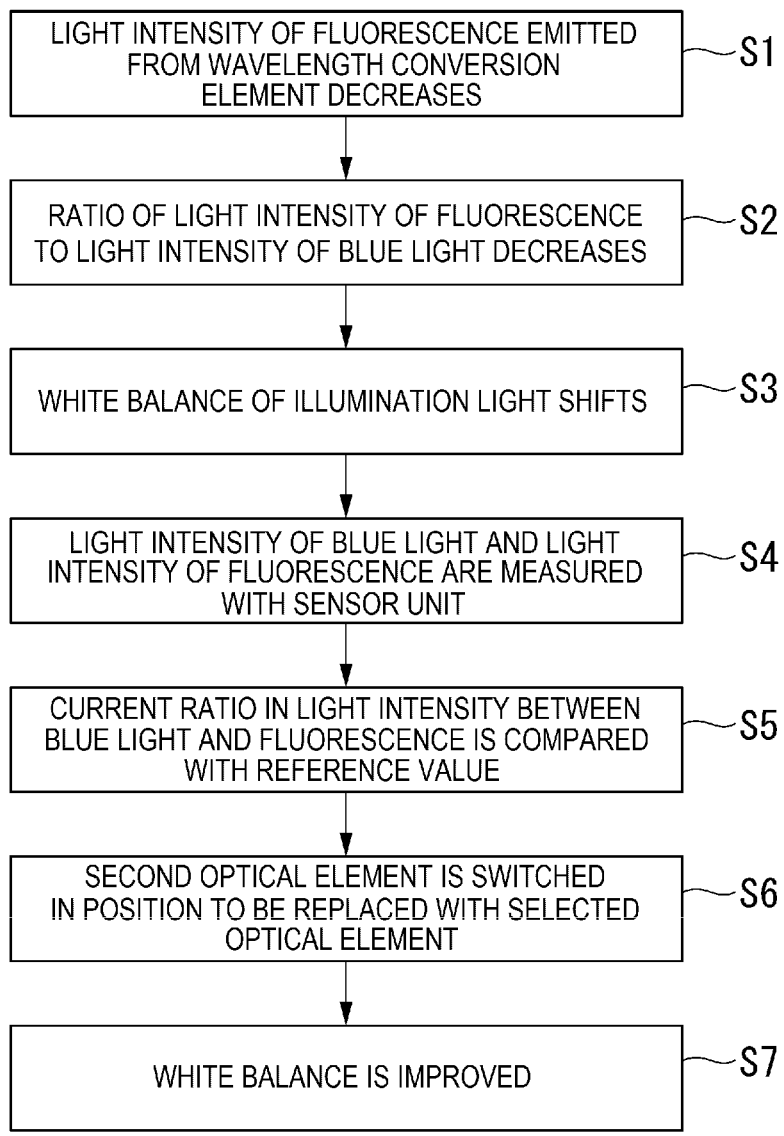
FIG. 6 is a flowchart showing a procedure of adjusting the white balance.

The concept of the countermeasure in the present embodiment against the misalignment of the white balance caused in this case will be described based on the flow chart shown in FIG. 6.

The phosphor generally has a characteristic that the conversion efficiency when converting the excitation light into the fluorescence drops as the light density of the excitation light rises. Therefore, when the light density of the blue light BL entering the wavelength conversion element 23 rises, the light intensity of the fluorescence YL emitted from the wavelength conversion element 23 decreases (step S1). Here, the explanation will be presented citing when the light intensity of the fluorescence YL decreases as an example, but the light intensity of the fluorescence YL increases in some cases. However, in either case, misalignment of the white balance with respect to the initial state occurs.

On this occasion, the ratio of the light intensity of the fluorescence YL to the light intensity of the blue light BL decreases (step S2). As a result, the white balance of the illumination light WL having the white color as a composite light of the blue light BL and the fluorescence YL having the yellow color is shifted (step S3) from before the temporal change occurs. Specifically, since the light intensity of the fluorescence YL having the yellow color with respect to the light intensity of the blue light BL relatively decreases, the illumination light WL changes to bluish-white light.

Here, the intensities of the blue light BL and the fluorescence YL having the yellow color included in the light taken out from the light intensity monitoring mirror 29 are measured (step S4) by the sensor unit 30. The control device 31 stores in advance the reference value of the ratio between the intensity of the blue light BL and the intensity of the fluorescence YL determined based on the initial intensity values at the moment when starting the use of the projector 1. The control device 31 compares (step S5) the current ratio between the intensity of the blue light BL and the intensity of the fluorescence YL detected by the sensor unit 30 with the reference value having been stored.

As a result, when a difference between the current ratio of the intensity of the blue light BL to the intensity of the fluorescence YL and the reference value exceeds an allowable range, the control device 31 selects the optical element 33, 34, or 35 having an appropriate transmittance from the third optical element 33, the sixth optical element 34, and the seventh optical element 35, switches the position of the second optical element 32, and then replaces (step S6) the second optical element 32 with the optical element 33, 34, or 35 thus selected so that the current ratio of the intensity of the blue light BL to the intensity of the fluorescence YL approaches the reference value (the initial value). For example, when the control device 31 selects the third optical element 33, the control device 31 switches the position of the second optical element 32 from the first position P1 to the second position P2, and at the same time, switches the position of the third optical element 33 from the fourth position to the third position.

By replacing the second optical element 32 with one of the third optical element 33, the sixth optical element 34, and the seventh optical element 35, and at the same time, determining which one of the third optical element 33, the sixth optical element 34, and the seventh optical element 35 the second optical element 32 is replaced with, it is possible to adjust the ratio of the intensity of the blue light BL to the fluorescence YL. Specifically, for example, when the control device 31 selects the third optical element 33, and replaces the second optical element 32 with the third optical element 33, the transmittance of the blue light BL in the rim portion of the optical element drops from 80% to 60%. Conversely, the reflectance of the blue light BL in the rim portion of the optical element rises from 20% to 40%. In other words, the light intensity of the blue light BL which is transmitted through the rim portion of the optical element and proceeds toward the integrator optical system 24 decreases, and the light intensity of the blue light BL which is reflected by the rim portion of the optical element and returns to the wavelength conversion element 23 increases.

On this occasion, as shown in FIG. 2, for example, the blue light BL reflected by the fourth area 33B of the third optical element 33 enters the wavelength conversion element 23 once again through the light collecting optical system 22, and makes a contribution to the excitation of the phosphor. Therefore, since the light intensity of the blue light BL which returns to the wavelength conversion element 23 to make a contribution to the excitation of the phosphor increases compared to before the replacement of the optical element, the light intensity of the fluorescence YL emitted from the wavelength conversion element 23 also increases. As a result, since the ratio of the light intensity of the fluorescence YL having the yellow color to the light intensity of the blue light BL increases, it is possible to adjust the illumination light WL from the bluish light to light having a color closer to white, and thus, it is possible to improve the white balance.

Although in the example described above, there is described the example of replacing the second optical element 32 with the third optical element 33, it is sufficient to replace the second optical element 32 with the sixth optical element 34 or the seventh optical element 35 when the white balance of the color of the illumination light WL is significantly shifted in a direction of changing from a white color to a bluish white color. Thus, it is possible to further increase the light intensity of the blue light BL which returns to the wavelength conversion element 23 to thereby further increase the light intensity of the fluorescence YL, and therefore, it is possible to improve the white balance.

Further, although in the example described above, there is described the adjustment procedure performed when the white balance is shifted in the direction in which the light intensity of the fluorescence YL emitted from the wavelength conversion element 23 decreases, it is possible for the illumination device 2 according to the present embodiment to perform the adjustment and also when the white balance is shifted in a direction in which the light intensity of the fluorescence YL emitted from the wavelength conversion element 23 increases. As a cause of the shift of this kind, it is conceivable that the blue light BL decreases and the fluorescence YL increases due to, for example, deterioration in output of the light emitting element 201 caused by the temporal change. In such a case, it is sufficient to adjust the white balance in advance while making the third optical element 33 enter the light path of the blue light BL and the fluorescence YL to be emitted from the wavelength conversion element 23 as, for example, an initial state, and then replace the third optical element 33 with the second optical element 32 when the white balance is shifted in an opposite manner to the example described above.

Advantages of First Embodiment

The illumination device 2 according to the present embodiment is provided with the light emitting element 201 for emitting the blue light BL in the first wavelength band, the wavelength conversion element 23 for converting the blue light BL into the fluorescence YL in the second wavelength band different from the first wavelength band, the first optical element 21 for reflecting the blue light BL and transmitting the fluorescence YL, and making the blue light BL enter the wavelength conversion element 23, the second optical element 32 having the first area 32A for transmitting the fluorescence YL, and the second area 32B for transmitting a part of the blue light BL and reflecting another part of the blue light BL, and the third optical element 33 having the third area 33A for transmitting the fluorescence YL, and the fourth area 33B for transmitting a part of the blue light BL and reflecting another part of the blue light BL, wherein in the second optical element 32, the transmittance of the blue light BL in the first area 32A is higher than the transmittance of the blue light BL in the second area 32B, the position of the second optical element 32 is made switchable between the first position P1 where the fluorescence YL transmitted through the first optical element 21 enters the first area 32A, and the blue light BL emitted from the wavelength conversion element 23 enters the second area 32B, and the second position P2 where the fluorescence YL transmitted through the first optical element 21 fails to enter the first area 32A, and the blue light BL emitted from the wavelength conversion element 23 fails to enter the second area 32B, in the third optical element 33, the transmittance of the blue light BL in the third area 33A is higher than the transmittance of the blue light BL in the fourth area 33B, the position of the third optical element 33 is made switchable between the third position where the fluorescence YL transmitted through the first optical element 21 enters the third area 33A, and the blue light BL emitted from the wavelength conversion element 23 enters the fourth area 33B, and the fourth position where the fluorescence YL transmitted through the first optical element 21 fails to enter the third area 33A, and the blue light BL emitted from the wavelength conversion element 23 fails to enter the fourth area 33B, and the transmittance of the blue light BL in the fourth area 33B of the third optical element 33 is different from the transmittance of the blue light BL in the second area 32B of the second optical element 32.

As described above, in the illumination device 2 according to the present embodiment, it is possible to adjust the white balance by switching the position of the second optical element 32 and the position of, for example, the third optical element 33. It should be noted that in order only to adjust the white balance, it is sufficient to adopt a configuration of replacing a dichroic mirror which does not have such areas as the first area 32A and the second area 32B in the present embodiment, and in which the transmittance of the blue light BL uniformly varies in the entire area. The illumination device having this configuration is defined as an illumination device according to a comparative example. However, in the illumination device according to the comparative example, there is a following problem.

As shown in FIG. 2, the blue light BL emitted from the wavelength conversion element 23 is substantially collimated as a whole by the light collecting optical system 22, but the blue light BL includes light fluxes respectively having a variety of angular components different from each other.

Here, attention is focused on the blue light BL which is emitted from the light collecting optical system 22, proceeds in parallel to the optical axis ax5 of the wavelength conversion element 23, and enters the second area 32B of the second optical element 32. A part of this blue light BL is reflected by the second area 32B, and then proceeds in parallel to the optical axis ax5 to return to the wavelength conversion element 23 through the light collecting optical system 22. On this occasion, since the second area 32B is disposed at the position where the second area 32B fails to overlap the first optical element 21 when viewed from the optical axis ax5 as shown in FIG. 3, the blue light BL reflected by the second area 32B enters the first optical element 21, but has no chance to become a loss.

Figure 7:
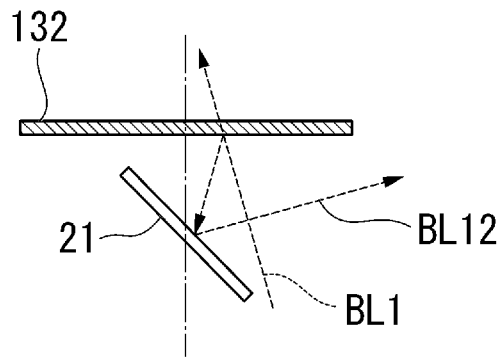
FIG. 7 is a diagram for explaining a problem of an illumination device according to a comparative example.

Then, attention is focused on a blue light BL1 which is a part of the blue light BL emitted from the light collecting optical system 22, proceeds in nonparallel to the optical axis ax5 of the wavelength conversion element 23 to bypass the first optical element 21 through a space outside the first optical element 21, and enters the central portion of the second optical element 32. As shown in FIG. 7, in the illumination device according to the comparative example, since a second optical element 132 is formed of a dichroic mirror having a transmittance uniform in the entire area, the transmittance of the blue light BL1 in a central portion of the second optical element 132 is the same as the transmittance of the blue light BL1 in a rim portion of the second optical element 132. Therefore, a part BL12 of the blue light BL1 entering the central portion of the second optical element 132 is reflected by the second optical element 132, and is then reflected by the first optical element 21, and proceeds in a direction different from a direction toward the wavelength conversion element 23 or the integrator optical system 24. Therefore, the blue light BL12 has no chance to return to the wavelength conversion element 23 to make a contribution to the wavelength conversion, and has no chance to make a contribution as the illumination light WL. As described above, the part BL12 of the blue light BL1 entering the central portion of the second optical element 132 becomes the loss.

In contrast, as shown in FIG. 2, in the illumination device 2 according to the present embodiment, the central portion of the second optical element 32 is formed of the first area 32A higher in transmittance of the blue light BL than the second area 32B in the rim portion. Similarly, the central portion of the third optical element 33 is formed of the third area 33A higher in transmittance of the blue light BL than the fourth area 33B in the rim portion. Therefore, unlike the illumination device according to the comparative example, it is possible to sufficiently reduce the blue light BL1 which is reflected by the second optical element 32, and then reflected by the first optical element 21 to become the loss. Thus, according to the illumination device 2 related to the present embodiment, it is possible to appropriately adjust the white balance, and at the same time, it is possible to suppress the loss of the blue light BL.

In particular in the case of the present embodiment, since the second optical element 32 and the third optical element 33 are disposed close to the first optical element 21, the blue light BL which bypasses the first optical element 21 through the space outside the first optical element 21 to enter the first area 32A and the third area 33A is originally small in amount. Further, since the first area 32A and the third area 33A are formed of the opening parts 37h, 38h provided to the dichroic mirrors 37, 38, respectively, it is possible for the blue light BL bypassing the first optical element 21 through the space outside the first optical element 21 to be transmitted through the first area 32A or the third area 33A with the transmittance of about 100% to make a contribution as the illumination light WL. Therefore, it is possible to substantially eliminate the loss of the blue light BL.

The projector 1 according to the present embodiment is equipped with the illumination device 2 having the advantages described above, and is therefore high in light use efficiency, and is excellent in color reproducibility.

Second Embodiment

A second embodiment of the present disclosure will hereinafter be described using FIG. 8A and FIG. 8B.

Configurations of a projector and an illumination device according to the second embodiment are substantially the same as those in the first embodiment, and configurations of optical elements are different from those of the first embodiment. Therefore, the description of the overall configurations of the projector and the illumination device will be omitted.

Figure 8A:
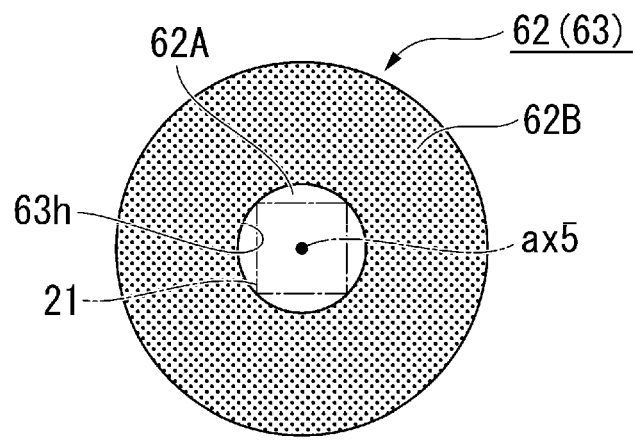
FIG. 8A is a front view of a fourth optical element used for an illumination device according to a second embodiment.

FIG. 8A is a front view of a fourth optical element in the present embodiment viewed from the Y-axis direction. FIG. 8B is a front view of a fifth optical element in the present embodiment viewed from the Y-axis direction.

Figure 8B:
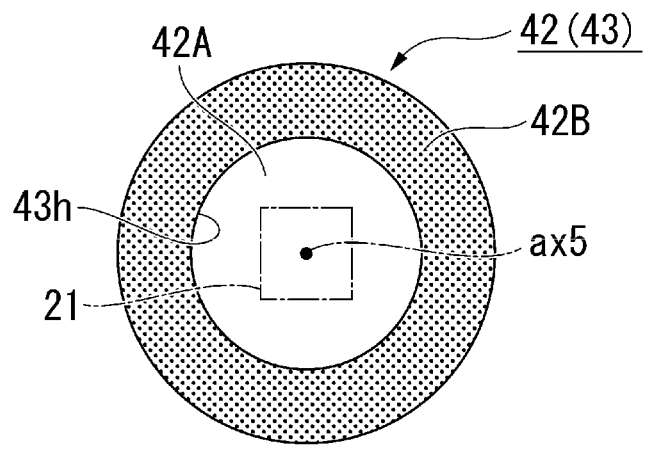
FIG. 8B is a front view of a fifth optical element used for the illumination device according to the second embodiment.

In FIG. 8A and FIG. 8B, the constituents common to the drawings used in the first embodiment are denoted by the same reference symbols, and the description thereof will be omitted.

Similarly to the illumination device 2 according to the first embodiment shown in FIG. 2, the illumination device according to the present embodiment is provided with the light source device 20, the first optical element 21, the light collecting optical system 22, the wavelength conversion element 23, a fourth optical element 62 corresponding to the second optical element 32, the switching device 28, the integrator optical system 24, the polarization conversion element 25, the superimposing lens 26, the light intensity monitoring mirror 29, the sensor unit 30, and the control device 31. The illumination device according to the present embodiment is further provided with a fifth optical element 42 shown in FIG. 8B as the optical element which replaces the fourth optical element 62 for adjusting the white balance.

As shown in FIG. 8A, the fourth optical element 62 has a fifth area 62A for transmitting the blue light BL and the fluorescence YL, and a sixth area 62B which transmits a part of the blue light BL and reflects another part of the blue light BL, and transmits the fluorescence YL. The fifth area 62A and the sixth area 62B are concentrically formed centering on the optical axis ax5. The fifth area 62A is disposed in the central portion, and the sixth area 62B is disposed in the rim portion surrounding the fifth area 62A. Further, when viewed from the direction of the optical axis ax5, the fifth area 62A is disposed at a position where the fifth area 62A overlaps the first optical element 21, and the sixth area 62B is disposed at a position where the sixth area 62B does not overlap the first optical element 21.

Specifically, the fourth optical element 62 is formed of a third dichroic mirror 63 which transmits a part of the blue light BL and reflects another part of the blue light BL, and transmits the fluorescence YL. A central portion of the third dichroic mirror 63 is provided with an opening part 63h. The fifth area 62A is formed of the opening part 63h provided to the third dichroic mirror 63, and the sixth area 62B is formed of a portion other than the opening part 63h. Therefore, in the case of the present embodiment, the fifth area 62A not only transmits the fluorescence YL with a transmittance of 100%, but also transmits the blue light BL with a transmittance of 100%. Therefore, the transmittance of the blue light BL in the fifth area 62A is higher than the transmittance of the blue light BL in the sixth area 62B.

As shown in FIG. 8B, the fifth optical element 42 has a seventh area 42A which is disposed in a central portion, and transmits the blue light BL and the fluorescence YL, and an eighth area 42B which is disposed in a rim portion, transmits a part of the blue light BL and reflects another part of the blue light BL, and transmits the fluorescence YL.

Specifically, the fifth optical element 42 is formed of a fourth dichroic mirror 43 which transmits a part of the blue light BL and reflects another part of the blue light BL, and transmits the fluorescence YL. A central portion of the fourth dichroic mirror 43 is provided with an opening part 43h. The seventh area 42A is formed of the opening part 43h provided to the fourth dichroic mirror 43, and the eighth area 42B is formed of a portion other than the opening part 43h. Therefore, in the case of the present embodiment, the seventh area 42A not only transmits the fluorescence YL with a transmittance of 100%, but also transmits the blue light BL with a transmittance of 100%. Therefore, the transmittance of the blue light BL in the seventh area 42A is higher than the transmittance of the blue light BL in the eighth area 42B.

In the first embodiment, the transmittance of the blue light BL in the fourth area 33B of the third optical element 33 corresponding to the eighth area 42B of the fifth optical element 42 is different from the transmittance of the blue light BL in the second area 32B of the second optical element 32 corresponding to the sixth area 62B of the fourth optical element 62. For example, the transmittance of the blue light BL in the fourth area 33B is 60%, and the transmittance of the blue light BL in the second area 32B corresponding to the sixth area 62B is 80%. In contrast, in the present embodiment, the transmittance of the blue light BL in the eighth area 42B of the fifth optical element 42 is equal to the transmittance of the blue light BL in the sixth area 62B of the fourth optical element 62. For example, the transmittance of the blue light BL in the eighth area 42B is 80%, and the transmittance of the blue light BL in the sixth area 62B is 80%. In other words, the third dichroic mirror 63 and the fourth dichroic mirror are formed of dichroic mirrors having the same transmittance.

In the present embodiment, the size of the opening part 63h provided to the third dichroic mirror 63 constituting the fourth optical element 62 and the size of the opening part 43h provided to the fourth dichroic mirror 43 constituting the fifth optical element 42 are different from each other. Thus, the area of the fifth area 62A of the fourth optical element 62 and the area of the seventh area 42A of the fifth optical element 42 are different from each other. Further, the area of the sixth area 62B of the fourth optical element 62 and the area of the eighth area 42B of the fifth optical element 42 are different from each other. Specifically, the area of the seventh area 42A of the fifth optical element 42 is larger than the area of the fifth area 62A of the fourth optical element 62. Further, the area of the eighth area 42B of the fifth optical element 42 is smaller than the area of the sixth area 62B of the fourth optical element 62.

In the case of the present embodiment, in the fourth optical element 62 shown in FIG. 8A, most of the blue light BL passing through the space outside the first optical element 21 in parallel to the optical axis ax5 enters the sixth area 62B. In contrast, in the fifth optical element 42 shown in FIG. 8B, a part of the blue light BL passing through the space outside the first optical element 21 in parallel to the optical axis ax5 enters the eighth area 42B, but there exists a larger amount of the blue light BL which enters the seventh area 42A, namely passes through the opening part 43h, compared to the fourth optical element 62.

In addition to the fourth optical element 62, the seventh area 42A of the fifth optical element 42 is not necessarily required to be formed of the opening part 43h, and can be formed of a light transmissive material such as glass. In either of the case in which the seventh area 42A is formed of the opening part 43h, or the case in which the seventh area 42A is formed of the light transmissive material, the transmittance of the blue light BL in the seventh area 42A is higher than the transmittance of the blue light BL in the eighth area 42B.

The switching device 28 switches the position of the fourth optical element 62. The fourth optical element 62 is arranged to be able to be switched by the switching device 28 between a fifth position where the fourth optical element 62 enters the light paths of the blue light BL and the fluorescence YL emitted from the wavelength conversion element 23, and a sixth position where the fourth optical element 62 is retracted from the light paths of the blue light BL and the fluorescence YL emitted from the wavelength conversion element 23.

In other words, the fourth optical element 62 is arranged to be able to be switched by the switching device 28 between the fifth position where the fluorescence YL transmitted through the first optical element 21 enters the fifth area 62A, and the blue light BL emitted from the wavelength conversion element 23 enters the sixth area 62B, and the sixth position where the fluorescence YL transmitted through the first optical element 21 fails to enter the fifth area 62A, and the blue light BL emitted from the wavelength conversion element 23 fails to enter the sixth area 62B.

Further, the switching device 28 switches the position of the fifth optical element 42. The fifth optical element 42 is arranged to be able to be switched by the switching device 28 between a seventh position where the fifth optical element 42 enters the light paths of the blue light BL and the fluorescence YL emitted from the wavelength conversion element 23, and an eighth position where the fifth optical element 42 is retracted from the light paths of the blue light BL and the fluorescence YL emitted from the wavelength conversion element 23.

In other words, the fifth optical element 42 is arranged to be able to be switched by the switching device 28 between the seventh position where the fluorescence YL transmitted through the first optical element 21 enters the seventh area 42A, and the blue light BL emitted from the wavelength conversion element 23 enters the eighth area 42B, and the eighth position where the fluorescence YL transmitted through the first optical element 21 fails to enter the seventh area 42A, and the blue light BL emitted from the wavelength conversion element 23 fails to enter the eighth area 42B.

In the case of the present embodiment, when comparing the fourth optical element 62 and the fifth optical element 42 with each other, the transmittance of the blue light BL in the sixth area 62B and the transmittance of the blue light BL in the eighth area 42B are the same. However, since the area of the eighth area 42B is smaller than the area of the sixth area 62B, and the area of the seventh area 42A is larger than the area of the fifth area 62A, the light intensity of the blue light BL transmitted through the fifth optical element 42 becomes higher than the light intensity of the blue light BL transmitted through the fourth optical element 62.

In the present embodiment, a procedure of adjusting the white balance will briefly be described.

In the present embodiment, in an opposite manner to the first embodiment, there is assumed when the light intensity of the fluorescence YL emitted from the wavelength conversion element 23 has increased. In this case, the white balance of the illumination light WL is shifted in a direction of changing to a yellowish white color.

When the light intensity of the fluorescence YL emitted from the wavelength conversion element 23 increases, the ratio of the light intensity of the fluorescence YL to the light intensity of the blue light BL also increases. Here, the intensity of the blue light BL and the intensity of the yellow fluorescence YL are measured with the sensor unit 30, and the control device 31 compares a current ratio between the intensity of the blue light BL and the intensity of the fluorescence YL detected by the sensor unit 30 with the reference value stored in advance.

As a result, when a difference between the current ratio of the intensity of the blue light BL to the intensity of the fluorescence YL and the reference value exceeds an allowable range, the control device 31 switches the position of the fourth optical element 62, and switches the position of the fifth optical element 42 to replace the fourth optical element 62 with the fifth optical element 42 so that the current ratio of the intensity of the blue light BL to the intensity of the fluorescence YL approaches the reference value. In other words, the control device 31 switches the position of the fourth optical element 62 from the fifth position to the sixth position, and at the same time, switches the position of the fifth optical element 42 from the eighth position to the seventh position.

On this occasion, the light intensity of the blue light BL transmitted through the seventh area 42A of the fifth optical element 42 to proceed toward the integrator optical system 24 becomes higher than the light intensity of the blue light BL transmitted through the fifth area 62A of the fourth optical element 62 to proceed toward the integrator optical system 24. Further, the light intensity of the blue light BL which is reflected by the eighth area 42B of the fifth optical element 42 and returns to the wavelength conversion element 23 becomes lower than the light intensity of the blue light BL which is reflected by the sixth area 62B of the fourth optical element 62 and returns to the wavelength conversion element 23.

Since the light intensity of the blue light BL which returns to the wavelength conversion element 23 to make a contribution to the excitation of the phosphor decreases compared to before the replacement of the optical element in such a manner, the light intensity of the fluorescence YL emitted from the wavelength conversion element 23 also decreases. In contrast, the light intensity of the blue light BL proceeding toward the integrator optical system 24 increases compared to before the replacement of the optical element. As a result, since the ratio of the light intensity of the fluorescence YL having the yellow color to the light intensity of the blue light BL decreases, it is possible to adjust the illumination light WL from the yellowish light to light having a color closer to white, and thus, it is possible to improve the white balance.

Further, although in the example described above, there is described the adjustment procedure performed when the white balance is shifted in the direction in which the light intensity of the fluorescence YL emitted from the wavelength conversion element 23 increases, it is possible for the illumination device according to the present embodiment to perform the adjustment when the white balance is shifted in a direction in which the light intensity of the fluorescence YL emitted from the wavelength conversion element 23 decreases. In this case, it is sufficient to adjust the white balance in advance while making the fifth optical element 42 enter the light path of the blue light BL and the fluorescence YL to be emitted from the wavelength conversion element 23 as, for example, an initial state, and then replace the fifth optical element 42 with the fourth optical element 62 when the white balance is shifted in an opposite manner to the example described above. Further, although in the present embodiment, there is cited an example of using the two optical elements 62, 42 respectively having the opening parts 63h, 43h different in size from each other, it is possible to use three or more optical elements different in size of the opening part from each other.

Advantages of Second Embodiment

The illumination device according to the present embodiment is provided with the light emitting element 201 for emitting the blue light BL in the first wavelength band, the wavelength conversion element 23 for converting the blue light BL into the fluorescence YL in the second wavelength band different from the first wavelength band, the first optical element 21 which reflects one of the blue light BL and the fluorescence YL and transmits the other thereof, and makes the blue light BL enter the wavelength conversion element 23, the fourth optical element 62 having the fifth area 62A for transmitting the fluorescence YL, and the sixth area 62B for transmitting a part of the blue light BL and reflecting another part of the blue light BL, and the fifth optical element 42 having the seventh area 42A for transmitting the fluorescence YL, and the eighth area 42B for transmitting a part of the blue light BL and reflecting another part of the blue light BL, wherein in the fourth optical element 62, the transmittance of the blue light BL in the fifth area 62A is higher than the transmittance of the blue light BL in the sixth area 62B, the position of the fourth optical element 62 is made switchable between the fifth position where the fluorescence YL transmitted through the first optical element 21 enters the fifth area 62A, and the blue light BL emitted from the wavelength conversion element 23 enters the sixth area 62B, and the sixth position where the fluorescence YL transmitted through the first optical element 21 fails to enter the fifth area 62A, and the blue light BL emitted from the wavelength conversion element 23 fails to enter the sixth area 62B, in the fifth optical element 42, the transmittance of the blue light BL in the seventh area 42A is higher than the transmittance of the blue light BL in the eighth area 42B, the position of the fifth optical element 42 is made switchable between the seventh position where the fluorescence YL transmitted through the first optical element 21 enters the seventh area 42A, and the blue light BL emitted from the wavelength conversion element 23 enters the eighth area 42B, and the eighth position where the fluorescence YL transmitted through the first optical element 21 fails to enter the seventh area 42A, and the blue light BL emitted from the wavelength conversion element 23 fails to enter the eighth area 42B, and the area of the sixth area 62B of the fourth optical element 62 is different from the area of the eighth area 42B of the fifth optical element 42.

According to this configuration, since it is possible to reduce the blue light BL which is reflected by the fourth optical element 62 or the fifth optical element 42, and is then reflected by the first optical element 21 to become a loss, it is possible to obtain substantially the same advantage as in the first embodiment such as the advantage that it is possible to appropriately adjust the white balance, and at the same time, suppress the loss of the blue light BL.

Further, since the fourth optical element 62 and the fifth optical element 42 are also disposed close to the first optical element 21 in the present embodiment, the blue light BL which bypasses the first optical element 21 through the space outside the first optical element 21 to enter the fifth area 62A or the seventh area 42A is originally small in amount. Further, since the fifth area 62A and the seventh area 42A are formed of the opening parts 63h, 43h provided to the dichroic mirrors 63, 43, respectively, it is possible for the blue light BL bypassing the first optical element 21 through the space outside the first optical element 21 to be transmitted through the fifth area 62A or the seventh area 42A with the transmittance of about 100% to make a contribution as the illumination light WL. Therefore, it is possible to substantially eliminate the loss of the blue light BL.

Third Embodiment

A third embodiment of the present disclosure will hereinafter be described using FIG. 9.

A configuration of a projector according to the third embodiment is substantially the same as that in the first embodiment, and a configuration of an illumination device is different from that of the first embodiment. Therefore, the description of the overall configuration of the projector will be omitted.

Figure 9:
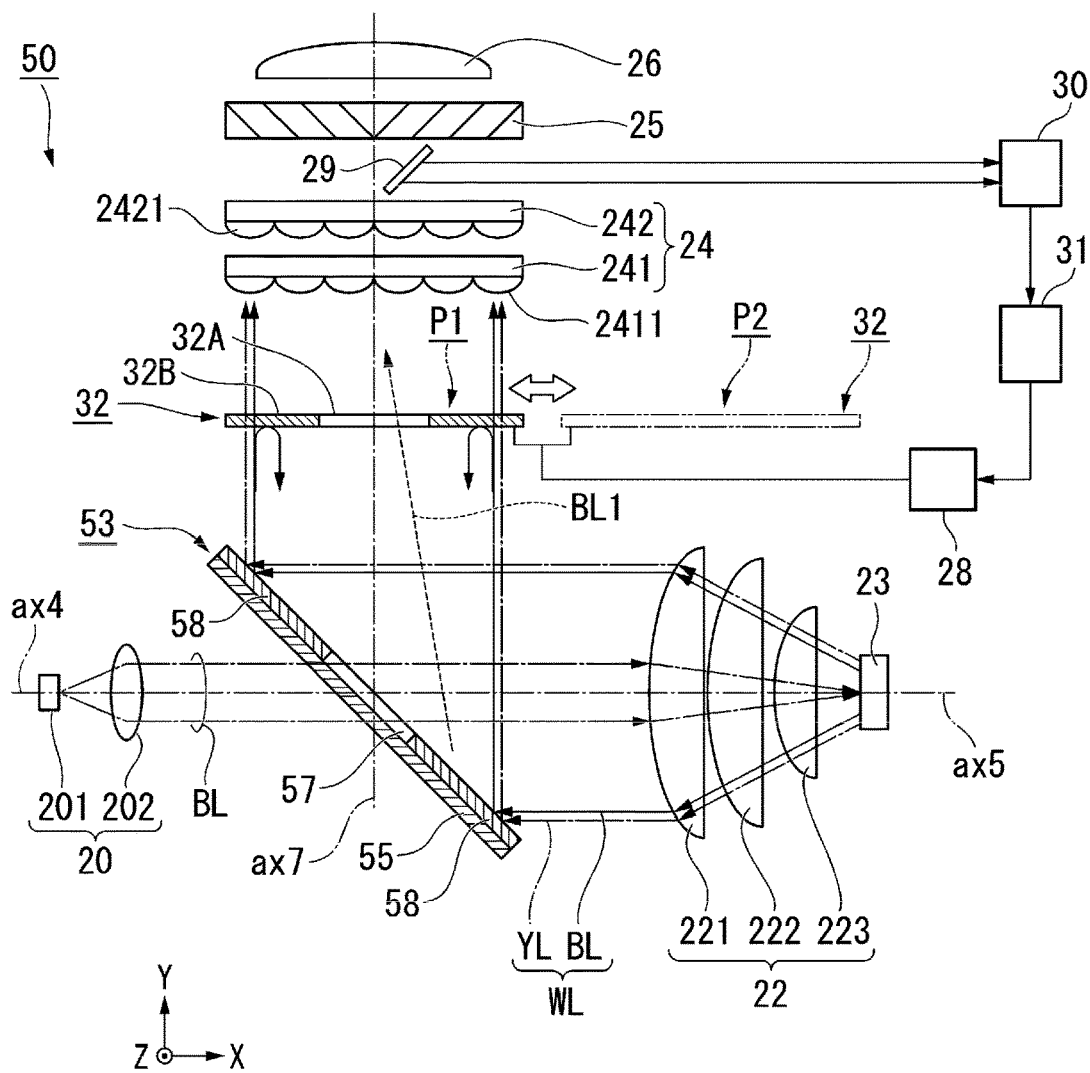
FIG. 9 is a schematic configuration diagram of an illumination device according to a third embodiment.

FIG. 9 is a schematic configuration diagram of the illumination device according to the third embodiment.

In FIG. 9, the constituents common to FIG. 2 used in the first embodiment are denoted by the same reference symbols, and the description thereof will be omitted.

As shown in FIG. 9, the illumination device 50 according to the present embodiment is provided with the light source device 20, a first optical element 53, the light collecting optical system 22, the wavelength conversion element 23, the second optical element 32, the switching device 28, the integrator optical system 24, the polarization conversion element 25, the superimposing lens 26, the light intensity monitoring mirror 29, the sensor unit 30, and the control device 31. Similarly to the illumination device 2 according to the first embodiment, the illumination device 50 according to the present embodiment is further provided with the third optical element 33 shown in FIG. 5A, the sixth optical element 34 shown in FIG. 5B, and the seventh optical element 35 shown in FIG. 5C as the optical elements with which the second optical element 32 is replaced for adjusting the white balance.

In the illumination device 2 according to the first embodiment, the optical axis ax4 of the light source device 20 and the optical axis ax5 of the wavelength conversion element 23 are perpendicular to each other. In contrast, in the illumination device 50 according to the present embodiment, the optical axis ax4 of the light source device 20 and the optical axis ax5 of the wavelength conversion element 23 are disposed in alignment with each other. Therefore, in the case of the present embodiment, the light emitting element 201, the collimating element 202, the first optical element 53, the light collecting optical system 22, and the wavelength conversion element 23 are disposed on the same optical axis. Further, the optical axis ax4 and the optical axis ax5 are perpendicular to an optical axis ax7 of a posterior optical system in which the second optical element 32, the integrator optical system 24, the polarization conversion element 25, and the superimposing lens 26 are disposed.

The first optical element 53 is disposed so as to form an angle of 45° with each of the optical axis ax4, the optical axis ax5, and the optical axis ax7. The optical element 53 has a substrate 55 having a light transmissive property, and an optical film disposed on one surface of the substrate 55. As the optical film, in a central portion of the first optical element 53 where the optical axis ax4, the optical axis ax5, and the optical axis ax7 cross each other, there is disposed a dichroic mirror 57 having a characteristic of transmitting light in the blue wavelength band, and reflecting light in the yellow wavelength band. In other words, in the dichroic mirror 57 in the present embodiment, the transmission wavelength band and the reflection wavelength band are reversed with respect to the first optical element 21 in the first embodiment. Further, at the both sides of the dichroic mirror 57, there are disposed mirrors 58 for reflecting both of the light in the blue wavelength band and the light in the yellow wavelength band. It is desirable for the dichroic mirror 57 to be as small as possible compared to the mirrors 58.

The rest of the configuration of the illumination device 50 is substantially the same as that of the illumination device 2 according to the first embodiment.

In the case of the present embodiment, the blue light BL emitted from the light emitting element 201 is transmitted through the dichroic mirror 57, and enters the wavelength conversion element 23 via the light collecting optical system 22. Further, the light which enters the dichroic mirror 57 out of the blue light BL emitted from the wavelength conversion element is transmitted through the dichroic mirror 57 to become the loss, but the light which enters the mirror 58 is reflected by the mirror 58, and then proceeds toward the second optical element 32. Further, the fluorescence YL emitted from the wavelength conversion element 23 is reflected by the dichroic mirror 57 or the mirror 58, and proceeds toward the second optical element 32.

Advantages of Third Embodiment

In the illumination device 50 according to the present embodiment, it is possible to obtain substantially the same advantage as in the first embodiment such as the advantage that it is possible to appropriately adjust the white balance, and at the same time, it is possible to suppress the loss of the blue light BL.

It should be noted that although in the present embodiment, there is described the configuration of applying the first optical element 53 having the dichroic mirror 57 for transmitting the blue light BL and reflecting the fluorescence YL to the illumination device 2 according to the first embodiment, it is possible to apply the first optical element 53 having the dichroic mirror 57 for transmitting the blue light BL and reflecting the fluorescence YL to the illumination device according to the second embodiment instead of the above configuration.

Modified Example of Wavelength Conversion Element

Although in the first embodiment, there is cited the example of the wavelength conversion element 23 including the scattering element such as the air holes, it is possible to use a wavelength conversion element 64 described below instead of the above configuration.

Figure 10:
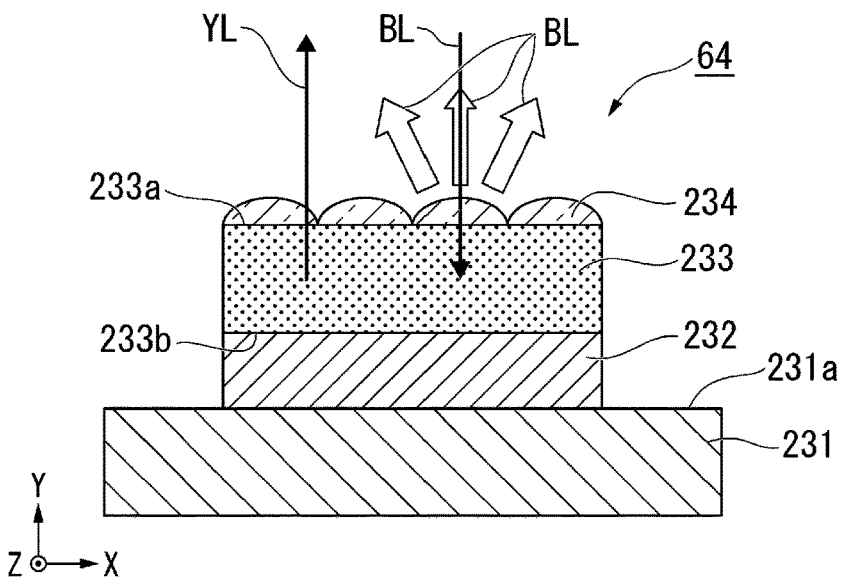
FIG. 10 is a cross-sectional view of a wavelength conversion element in a modified example.

FIG. 10 is a cross-sectional view of the wavelength conversion element 64 in the modified example.

As shown in FIG. 10, the wavelength conversion element 64 is provided with a substrate 231, a reflecting layer 232, a wavelength conversion layer 233, and a structure 234. The wavelength conversion layer 233 has a first surface 233a which the blue light BL enters, and a second surface 233b different from the first surface 233a. In the wavelength conversion layer 233, the first surface 233a and the second surface 233b are opposed to each other. The wavelength conversion element 64 converts the blue light BL emitted from the light collecting optical system 22 into the fluorescence YL in the second wavelength band different from the first wavelength band. The wavelength conversion layer 233 includes a ceramic phosphor for converting the blue light BL into the fluorescence YL having the yellow color. The second wavelength band is, for example, 490 through 750 nm, and the fluorescence YL is the yellow light including the green light component and the red light component. It should be noted that it is also possible for the phosphor to include a single-crystal phosphor. Further, the planar shape of the wavelength conversion element 64 is a substantially square shape when viewed from the incident direction (the Y-axis direction) of the blue light BL.

The substrate 231 functions as a support substrate for supporting the reflecting layer 232, the wavelength conversion layer 233, and the structure 234, and at the same time, functions as a radiator substrate for releasing the heat generated in the wavelength conversion layer 233. The substrate 231 is formed of a material having high thermal conductivity such as metal or ceramics. The substrate 231 has a first surface 231a provided with the wavelength conversion layer 233.

The reflecting layer 232 is disposed on the first surface 231a of the substrate 231. Specifically, the reflecting layer 232 is located between the first surface 231a of the substrate 231 and the second surface 233b of the wavelength conversion layer 233, and reflects the fluorescence YL which enters the reflecting layer 232 from the wavelength conversion layer 233 toward the wavelength conversion layer 233. Therefore, the first surface 231a of the substrate 231 on which the reflecting layer 232 is disposed and the second surface 233b of the wavelength conversion layer 233 are opposed to each other. The reflecting layer 232 is formed of a laminated film including, for example, a dielectric multilayer film, a metal mirror, and a reflection enhancing film. Further, the reflecting layer 232 can be formed of a multilayer film including, for example, a dielectric multilayer film, a metal mirror, and a reflection enhancing film.

The wavelength conversion layer 233 includes, for example, an yttrium aluminum garnet (YAG) type phosphor. As an example of the YAG type phosphor, there can be cited YAG:Ce including cerium (Ce) as an activator agent.

The structure 234 is disposed on the first surface 233a of the wavelength conversion layer 233. The structure 234 scatters a part of the blue light BL which enters the wavelength conversion element 23, and then reflects the result toward an opposite direction to the incident direction of the blue light BL. The structure 234 is formed of a light transmissive material, and has a plurality of scattering structures. The scattering structures in the present embodiment each have a lens shape formed of a protruding part.

The structure 234 is formed separately from the wavelength conversion layer 233. A method of forming a dielectric body using, for example, an evaporation process, a sputtering process, a CVD process, or a coating process, and then processing the dielectric body using photolithography is suitable for the structure 234 in the present embodiment. It is desirable for the structure 234 to be formed of a material which is low in light absorption and is chemically stable. Specifically, the structure 234 is formed of a material having a refractive index in a range of 1.3 through 2.5, and there can be used, for example, $SiO_2$, SiON, or $TiO_2$. For example, when forming the structure 234 using $SiO_2$, it is possible to accurately process the structure 234 using wet etching or dry etching.

The wavelength conversion element 64 in the present modified example has the wavelength conversion layer 233 for converting the blue light BL into the fluorescence YL, the structure 234 disposed on the first surface 233a of the wavelength conversion layer 233, and the reflecting layer 232 disposed on the second surface 233b of the wavelength conversion layer 233.

According to this configuration, since apart of the blue light BL which has not yet entered the wavelength conversion layer 233 can be scattered backward with the structure 234, it is possible to effectively use the part of the blue light BL as the illumination light. Further, by adjusting the shape, the pitch, and so on of the structure 234, it is possible to control the angular distribution of the blue light BL to be emitted from the wavelength conversion element 64.

It should be noted that the scope of the present disclosure is not limited to the embodiments described above, but a variety of modifications can be provided thereto within the scope or the spirit of the present disclosure.

For example, the illumination device is provided with the sensor unit for measuring the intensity of the blue light and the intensity of the fluorescence included in the illumination light in the embodiments described above, but it is possible to provide a temperature sensor for measuring the ambient temperature of the projector as a device for detecting a shift of the white balance instead of the above configuration. According to this configuration, it is possible to improve the shift of the white balance due to the variation in intensity of the blue light emitted from the light emitting element corresponding to the ambient temperature. Alternatively, it is possible for the illumination device to be provided with the temperature sensor for measuring the temperature of the wavelength conversion element as a device for detecting the shift of the white balance. According to this configuration, it is possible to improve the shift of the white balance due to the variation in the intensity of the fluorescence emitted from the wavelength conversion element corresponding to the temperature of the wavelength conversion element.

Further, instead of the configuration in which the control device controls the switching device, and the switching device automatically switches the position of the optical element such as the second optical element, it is possible to adopt a configuration in which the control device outputs a warning of announcing that the shift of the white balance has occurred, and a configuration in which the user manually switches the position of the optical element such as the second optical element when the warning is output.

Alternatively, it is possible for the illumination device to be provided with a display mode selector switch instead of the configuration provided with the sensor. According to this configuration, it is possible to realize a configuration in which the control device switches the position of the second optical element and so on in accordance with a selection result when the user selects the display mode such as a brightness priority mode or a chromatic purity priority mode using the display mode selector switch. In other words, in this configuration, it is possible for the user to adjust the white balance according to the taste of the user.

Further, although there is cited the example of using the second optical element and the third optical element in the first embodiment, and using the fourth optical element and the fifth optical element in the second embodiment for adjusting the white balance, it is possible to adjust the white balance only by switching the position of the second optical element using the second optical element alone without using the third optical element. For example, when making the second optical element enter the light paths of the blue light and the fluorescence, the light intensity of the fluorescence relatively increases, and thus, a yellowish white color can be obtained, and when retracting the second optical element from the light paths of the blue light and the fluorescence, the light intensity of the blue light relatively increases, and thus, a bluish white color can be obtained. Similarly, it is possible to adjust the white balance only by switching the position of the fourth optical element using the fourth optical element alone without using the fifth optical element.

Further, the first optical element is disposed at a position where the optical axis of the light source device and the optical axis of the wavelength conversion element cross each other in the first embodiment described above, but can be disposed at a position having an offset from the optical axis of the wavelength conversion element.

Further, in the embodiments described above, there is cited an example of the stationary wavelength conversion element which is not made rotatable, but the present disclosure can also be applied to an illumination device having a wavelength conversion element which is made rotatable with a motor.

Besides the above, the specific descriptions of the shape, the number, the arrangement, the constituent material, and so on of the constituents of the illumination device and the projector are not limited to those in the embodiments described above, but can arbitrarily be modified. Although in each of the embodiments, there is described the example of installing the illumination device according to the present disclosure in the projector using the liquid crystal light valves, the example is not a limitation. The illumination device according to the present disclosure can also be applied to a projector using digital micromirror devices as the light modulation devices. Further, the projector is not required to have a plurality of light modulation devices, and can be provided with just one light modulation device.

Although in the embodiments described above, there is described the example of applying the illumination device according to an aspect of the present disclosure to the projector, the example is not a limitation. The illumination device according to an aspect of the present disclosure can also be applied to lighting equipment, a headlight of a vehicle, and so on.

It is also possible for an illumination device according to another aspect of the present disclosure to have the following configuration.

The illumination device according to an aspect of the present disclosure includes a light emitting element configured to emit first light in a first wavelength band, a wavelength conversion element configured to convert the first light into second light in a second wavelength band different from the first wavelength band, a first optical element configured to reflect one of the first light and the second light, transmit another of the first light and the second light, and make the first light enter the wavelength conversion element, a second optical element having a first area configured to transmit the second light, and a second area configured to transmit a part of the first light and reflect another part of the first light, and a third optical element having a third area configured to transmit the second light, and a fourth area configured to transmit a part of the first light and reflect another part of the first light, wherein in the second optical element, a transmittance of the first light in the first area is higher than a transmittance of the first light in the second area, a position of the second optical element is made switchable between a first position where the second light which is transmitted or reflected by the first optical element enters the first area, and the first light emitted from the wavelength conversion element enters the second area, and a second position where the second light which is transmitted or reflected by the first optical element fails to enter the first area, and the first light emitted from the wavelength conversion element fails to enter the second area, in the third optical element, a transmittance of the first light in the third area is higher than a transmittance of the first light in the fourth area, a position of the third optical element is made switchable between a third position where the second light which is transmitted or reflected by the first optical element enters the third area, and the first light emitted from the wavelength conversion element enters the fourth area, and a fourth position where the second light which is transmitted or reflected by the first optical element fails to enter the third area, and the first light emitted from the wavelength conversion element fails to enter the fourth area, and the transmittance of the first light in the fourth area of the third optical element is different from the transmittance of the first light in the second area of the second optical element.

In the illumination device according to the one aspect of the present disclosure, the second optical element may be formed of a first dichroic mirror configured to transmit a part of the first light, reflect another part of the first light, and transmit the second light, the first area may be formed of an opening part provided to the first dichroic mirror, the third optical element may be formed of a second dichroic mirror configured to transmit a part of the first light, reflect another part of the first light, and transmit the second light, and the third area may be formed of an opening part provided to the second dichroic mirror.

The illumination device according to another aspect of the present disclosure includes a light emitting element configured to emit first light in a first wavelength band, a wavelength conversion element configured to convert the first light into second light in a second wavelength band different from the first wavelength band, a first optical element configured to reflect one of the first light and the second light, transmit another of the first light and the second light, and make the first light enter the wavelength conversion element, a fourth optical element having a fifth area configured to transmit the second light, and a sixth area configured to transmit a part of the first light and reflect another part of the first light, and a fifth optical element having a seventh area configured to transmit the second light, and an eighth area configured to transmit a part of the first light and reflect another part of the first light, wherein in the fourth optical element, a transmittance of the first light in the fifth area is higher than a transmittance of the first light in the sixth area, a position of the fourth optical element is made switchable between a fifth position where the second light which is transmitted or reflected by the first optical element enters the fifth area, and the first light emitted from the wavelength conversion element enters the sixth area, and a sixth position where the second light which is transmitted or reflected by the first optical element fails to enter the fifth area, and the first light emitted from the wavelength conversion element fails to enter the sixth area, in the fifth optical element, a transmittance of the first light in the seventh area is higher than a transmittance of the first light in the eighth area, a position of the fifth optical element is made switchable between a seventh position where the second light which is transmitted or reflected by the first optical element enters the seventh area, and the first light emitted from the wavelength conversion element enters the eighth area, and an eighth position where the second light which is transmitted or reflected by the first optical element fails to enter the seventh area, and the first light emitted from the wavelength conversion element fails to enter the eighth area, and an area of the eighth area of the fifth optical element is different from an area of the sixth area of the fourth optical element.

In the illumination device according to the another aspect of the present disclosure, the fourth optical element may be formed of a third dichroic mirror configured to transmit a part of the first light, reflect another part of the first light, and transmit the second light, the fifth area may be formed of an opening part provided to the third dichroic mirror, the fifth optical element may be formed of a fourth dichroic mirror configured to transmit a part of the first light, reflect another part of the first light, and transmit the second light, and the seventh area may be formed of an opening part provided to the fourth dichroic mirror.

In the illumination device according to one of the aspects of the present disclosure, the wavelength conversion element may include a wavelength conversion layer configured to convert the first light into the second light, a structure provided to a first surface of the wavelength conversion layer, and a reflecting layer provided to a second surface of the wavelength conversion layer.

The projector according to still another aspect of the present disclosure may have the following configuration.

The projector according to still another aspect of the present disclosure includes the illumination device according to one of the aspects of the present disclosure, a light modulation device configured to modulate light from the illumination device in accordance with image information, and a projection optical device configured to project the light modulated by the light modulation device.

What is claimed is:
1. An illumination device comprising:
a light emitting element configured to emit first light in a first wavelength band;
a wavelength conversion element configured to convert the first light into second light in a second wavelength band different from the first wavelength band;
a first optical element configured to reflect one of the first light and the second light, transmit another of the first light and the second light, and make the first light enter the wavelength conversion element;
a second optical element having a first area configured to transmit the second light, and a second area configured to transmit a part of the first light and reflect another part of the first light; and
a third optical element having a third area configured to transmit the second light, and a fourth area configured to transmit a part of the first light and reflect another part of the first light, wherein
in the second optical element, a transmittance of the first light in the first area is higher than a transmittance of the first light in the second area,
a position of the second optical element is made switchable between a first position where the second light which is transmitted or reflected by the first optical element enters the first area, and the first light emitted from the wavelength conversion element enters the second area, and a second position where the second light which is transmitted or reflected by the first optical element fails to enter the first area, and the first light emitted from the wavelength conversion element fails to enter the second area, in the third optical element, a transmittance of the first light in the third area is higher than a transmittance of the first light in the fourth area, a position of the third optical element is made switchable between a third position where the second light which is transmitted or reflected by the first optical element enters the third area, and the first light emitted from the wavelength conversion element enters the fourth area, and a fourth position where the second light which is transmitted or reflected by the first optical element fails to enter the third area, and the first light emitted from the wavelength conversion element fails to enter the fourth area, and the transmittance of the first light in the fourth area of the third optical element is different from the transmittance of the first light in the second area of the second optical element.

2. The illumination device according to claim 1, wherein the second optical element is formed of a first dichroic mirror configured to transmit a part of the first light, reflect another part of the first light, and transmit the second light, the first area is formed of an opening part provided to the first dichroic mirror, the third optical element is formed of a second dichroic mirror configured to transmit a part of the first light, reflect another part of the first light, and transmit the second light, and the third area is formed of an opening part provided to the second dichroic mirror.

3. An illumination device comprising:

a light emitting element configured to emit first light in a first wavelength band;

a wavelength conversion element configured to convert the first light into second light in a second wavelength band different from the first wavelength band;

a first optical element configured to reflect one of the first light and the second light, transmit another of the first light and the second light, and make the first light enter the wavelength conversion element;

a fourth optical element having a fifth area configured to transmit the second light, and a sixth area configured to transmit a part of the first light and reflect another part of the first light; and a fifth optical element having a seventh area configured to transmit the second light, and an eighth area configured to transmit a part of the first light and reflect another part of the first light, wherein in the fourth optical element, a transmittance of the first light in the fifth area is higher than a transmittance of the first light in the sixth area, a position of the fourth optical element is made switchable between a fifth position where the second light which is transmitted or reflected by the first optical element enters the fifth area, and the first light emitted from the wavelength conversion element enters the sixth area, and a sixth position where the second light which is transmitted or reflected by the first optical element fails to enter the fifth area, and the first light emitted from the wavelength conversion element fails to enter the sixth area, in the fifth optical element, a transmittance of the first light in the seventh area is higher than a transmittance of the first light in the eighth area, a position of the fifth optical element is made switchable between a seventh position where the second light which is transmitted or reflected by the first optical element enters the seventh area, and the first light emitted from the wavelength conversion element enters the eighth area, and an eighth position where the second light which is transmitted or reflected by the first optical element fails to enter the seventh area, and the first light emitted from the wavelength conversion element fails to enter the eighth area, and an area of the eighth area of the fifth optical element is different from an area of the sixth area of the fourth optical element.

4. The illumination device according to claim 3, wherein the fourth optical element is formed of a third dichroic mirror configured to transmit a part of the first light, reflect another part of the first light, and transmit the second light, the fifth area is formed of an opening part provided to the third dichroic mirror, the fifth optical element is formed of a fourth dichroic mirror configured to transmit a part of the first light, reflect another part of the first light, and transmit the second light, and the seventh area is formed of an opening part provided to the fourth dichroic mirror.

5. The illumination device according to claim 1, wherein the wavelength conversion element includes a wavelength conversion layer configured to convert the first light into the second light, a structure provided to a first surface of the wavelength conversion layer, and a reflecting layer provided to a second surface of the wavelength conversion layer.

6. A projector comprising:

the illumination device according to claim 1;

a light modulation device configured to modulate light from the illumination device in accordance with image information; and a projection optical device configured to project the light modulated by the light modulation device.

* * * * *